United States Patent [19]

Chen et al.

[11] Patent Number: 5,683,156
[45] Date of Patent: Nov. 4, 1997

[54] COMPUTER HOUSING

[75] Inventors: Hsi-Jen Chen, San Chung; Der-Shing Su, Pa-Teh, both of Taiwan

[73] Assignee: Elitegroup Computer Systems, Co., Ltd., Taipei, Taiwan

[21] Appl. No.: 613,474

[22] Filed: Mar. 11, 1996

[51] Int. Cl.⁶ ................................................. A47B 81/00
[52] U.S. Cl. ..................... 312/223.2; 361/683; 361/685; 312/265.6
[58] Field of Search ........................... 361/724, 725, 361/726, 727, 732, 829, 683, 684, 685; 312/223.1, 223.2, 265.5, 265.6, 257.1, 263, 7.2; 403/326, 329; 364/708.1

[56] References Cited

U.S. PATENT DOCUMENTS

| | | | |
|---|---|---|---|
| 3,814,491 | 6/1974 | Kackley | 312/257.1 |
| 4,858,070 | 8/1989 | Buron et al. | 361/725 X |
| 5,036,313 | 7/1991 | Lin et al. | 364/708.1 X |
| 5,337,464 | 8/1994 | Steffes | 364/708.1 X |
| 5,447,367 | 9/1995 | Wei | 312/263 X |
| 5,510,957 | 4/1996 | Takagi | 361/725 X |
| 5,547,272 | 8/1996 | Paterson et al. | 361/724 X |

OTHER PUBLICATIONS

IBM Technical Disclosure Bulletin; vol. 28, No. 7 Dec. 1985.

*Primary Examiner*—Peter M. Cuomo
*Assistant Examiner*—Janet M. Wilkens

[57] ABSTRACT

A computer housing includes a frame body having a receiving frame for holding therewith a data read/write device, a from board provided with a first floating fastening element, and a second floating fastening element provided on the data read/write device such that the second floating fastening element can be moved to engage with the first floating fastening element of the front board so as to enable the front board to be fastened securely with the frame body. A computer housing has a plurality of floating retainers to facilitate the speedy assembly of the computer, and thereby, the improved computer housing which can be joined with the front board securely without the use of fastening screws.

12 Claims, 7 Drawing Sheets

COMPUTER HOUSING

FIELD OF THE INVENTION

The present invention relates generally to a computer housing, and more particularly to a moniputer housing.

BACKGROUND OF THE INVENTION

The conventional computer housing is provide with a front board which is not made integrally with the housing. In other words, the front board is made separately and is then joined with the housing. The front board is provided with a plurality of locating projections by injection molding. When the front board is joined with the housing, the locating projections of the front board are engaged with the locating holes of the housing. Since the locating projections of the front board are made by injection molding, it is very likely that the locating projections of the front board are not exactly corresponding in location to the locating holes of the housing. As a result, the front board cannot be joined securely with the housing. In addition, the conventional computer housing is fastened with the front board with a plurality of screws. It is therefore readily apparent that the conventional computer housing is not cost-effective.

SUMMARY OF THE INVENTION

It is therefore the primary objective of the present invention to provide a computer housing with a plurality of floating retainers to facilitate the speedy assembly of the computer.

It is another objective of the present invention to provide an improved computer housing which can be joined with the front board securely without the use of fastening screws.

The foregoing objectives of the present invention are attained by a computer housing which comprises a frame body having a receiving frame for holding therewith a data read/write device, a front board provided with a first floating fastening element, and a second floating fastening element provided on the data read/write device such that the second floating fastening element can be moved to engage with the first floating fastening element of the front board so as to enable the front board to be fastened securely with the frame body.

In accordance with another aspect of the present invention, the front board is detachably fastened with the frame body.

In accordance with another aspect of the present invention, the front board is provided with a plurality of retaining members, and wherein the frame body is provided with a plurality of retaining members engageable with the retaining members of the front board. Preferably, the front board is provided with a through hole which is corresponding in location to the retaining members of the frame body and is dimensioned to allow a hand tool or a pointed object to go therethrough to urge the retaining members of the frame body so as to cause the front board to disengage from the frame body. The first floating fastening element preferably comprises at least one locating protuberance, and the second floating fastening element comprises a locating frame and a connection plate having a locating hole. The locating frame and the connection plate are preferably made integrally.

In accordance with another aspect of the present invention, the locating frame is of a recessed construction for holding the data read/write device, and wherein the connection plate is located at a front edge of a bottom of an opening of the locating frame.

In accordance with another aspect of the present invention, the connection plate can be moved to enable the locating hole of the connection plate to engage with one of the locating protuberances of the first floating fastening element.

In accordance with another aspect of the present invention, the locating frame is of an inverted U-shaped construction and is provided with a holding member for retaining the data read/write device mounted on the receiving frame of the frame body, and wherein the connection plate is movably fastened with one of two leg portions of the locating frame having the inverted U-shaped construction. The connection plate can be moved to enable the locating hole of the connection plate to engage with one of the locating protuberances of the first floating fastening element.

In accordance with another aspect of the present invention, the data read/write device can be a floppy disk drive, a hard disk drive or a CD-ROM drive.

In accordance with another aspect of the present invention, the receiving frame of the frame body is provided with an urging member for limiting the motion of the data read/write device in the receiving frame.

In accordance with another aspect of the present invention, the computer housing is a moniputer housing.

The foregoing objectives, features, functions and advantages of the present invention will be more readily understood upon a thoughtful deliberation of the following detailed description of the present invention in conjunction with the accompany drawings.

DETAILED DESCRIPTION OF THE PREFERRED EMBODIMENT

Figure 1A:
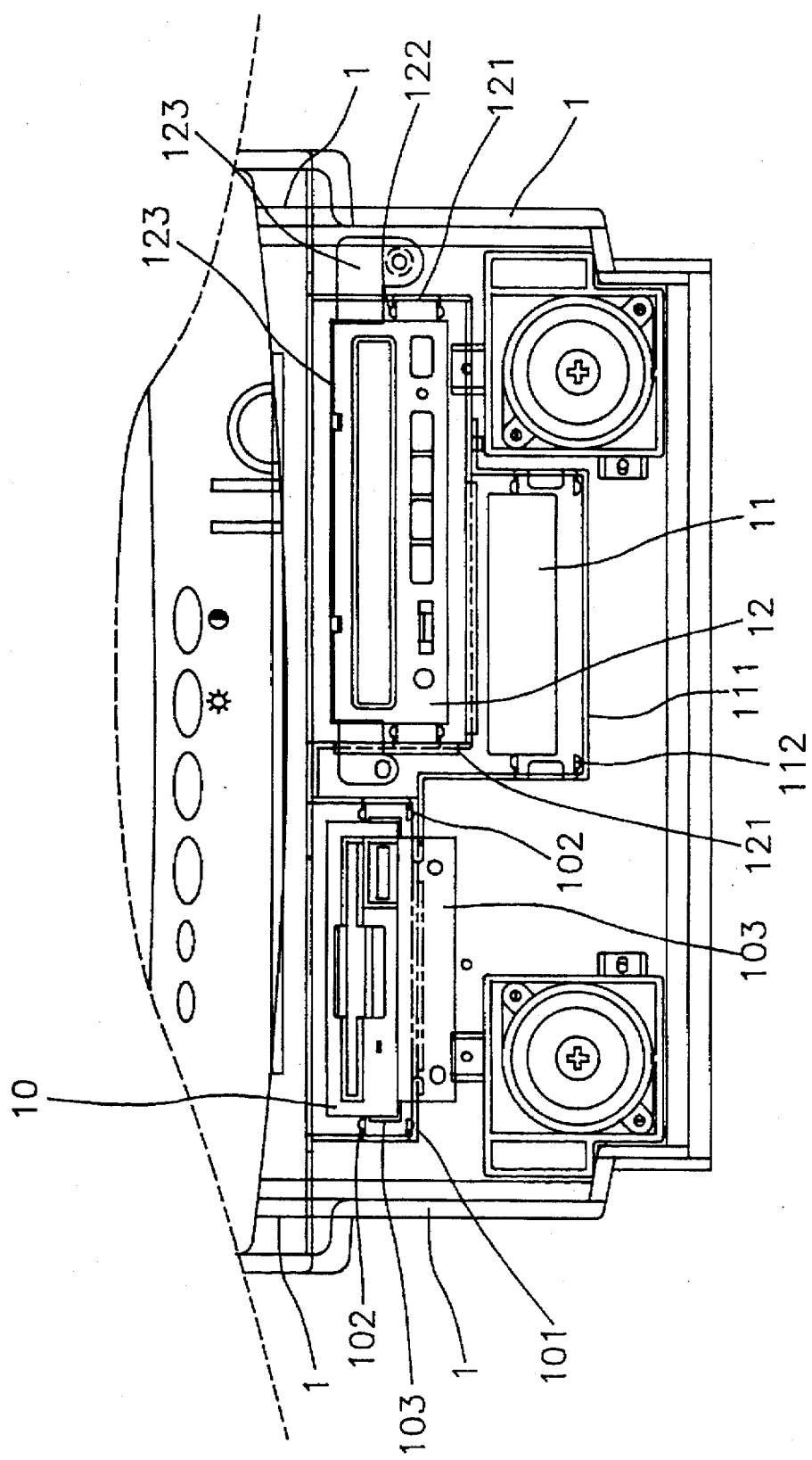
FIG. 1(a) shows a schematic view of a preferred embodiment according to the present invention.

As shown in the drawings provided therewith, the moniputer housing of the preferred embodiment according to the present invention comprises a frame body 1, a front board 2, a first floating fastening element 21, and a plurality of second floating fastening elements 103 and 123.

As shown in FIG. 1(a), the frame body 1 is provided with a plurality of receiving frames 101, 111 and 121 for holding respectively a floppy disk drive 10, a hard disk drive 11 and a CD-ROM drive 12. The receiving frames 101, 111 and 121 are provided respectively with at least one urging element 102, 112 and 122.

Figure 1B:
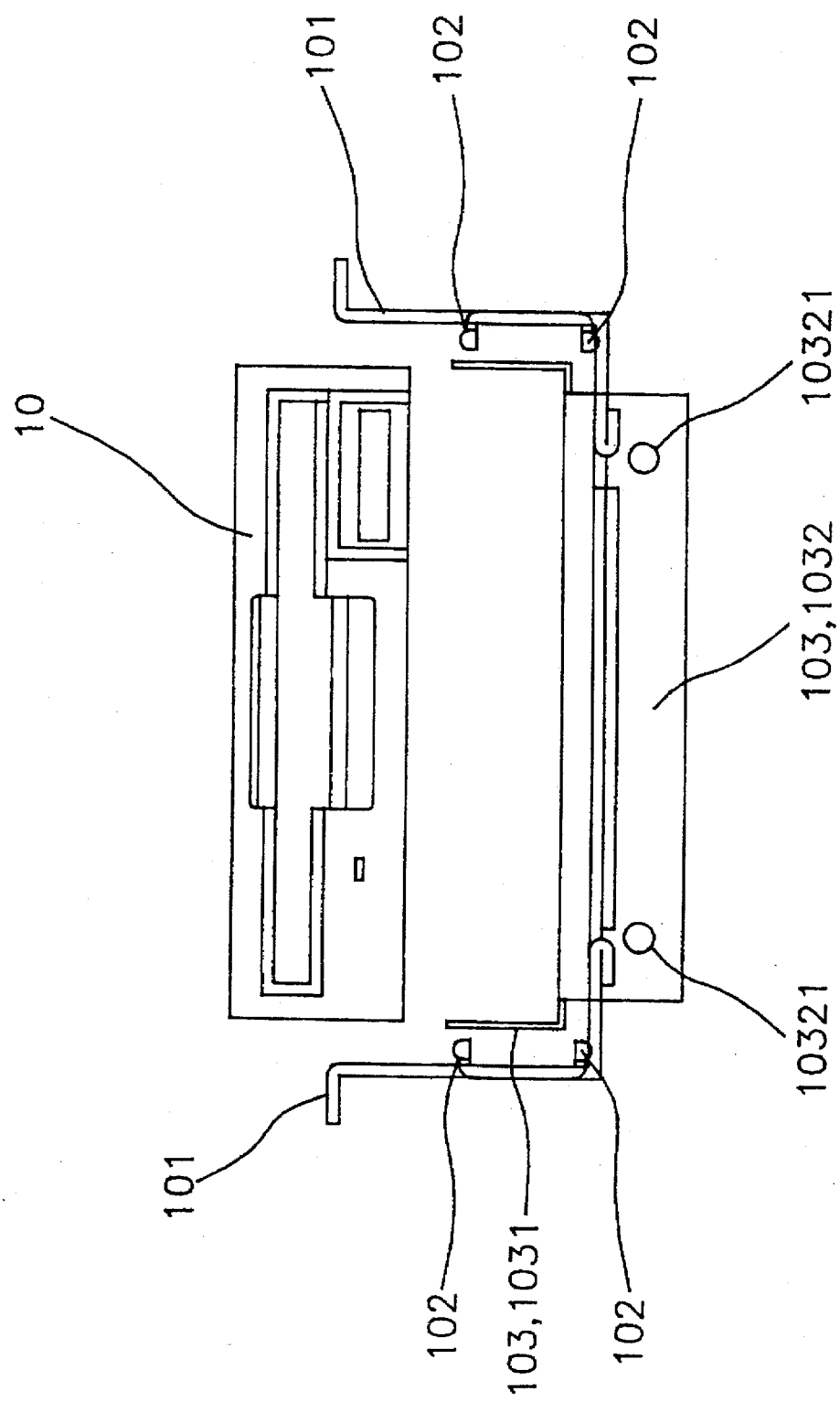
FIG. 1(b) shows another schematic view of the preferred embodiment according to the present invention.
Figure 1C:
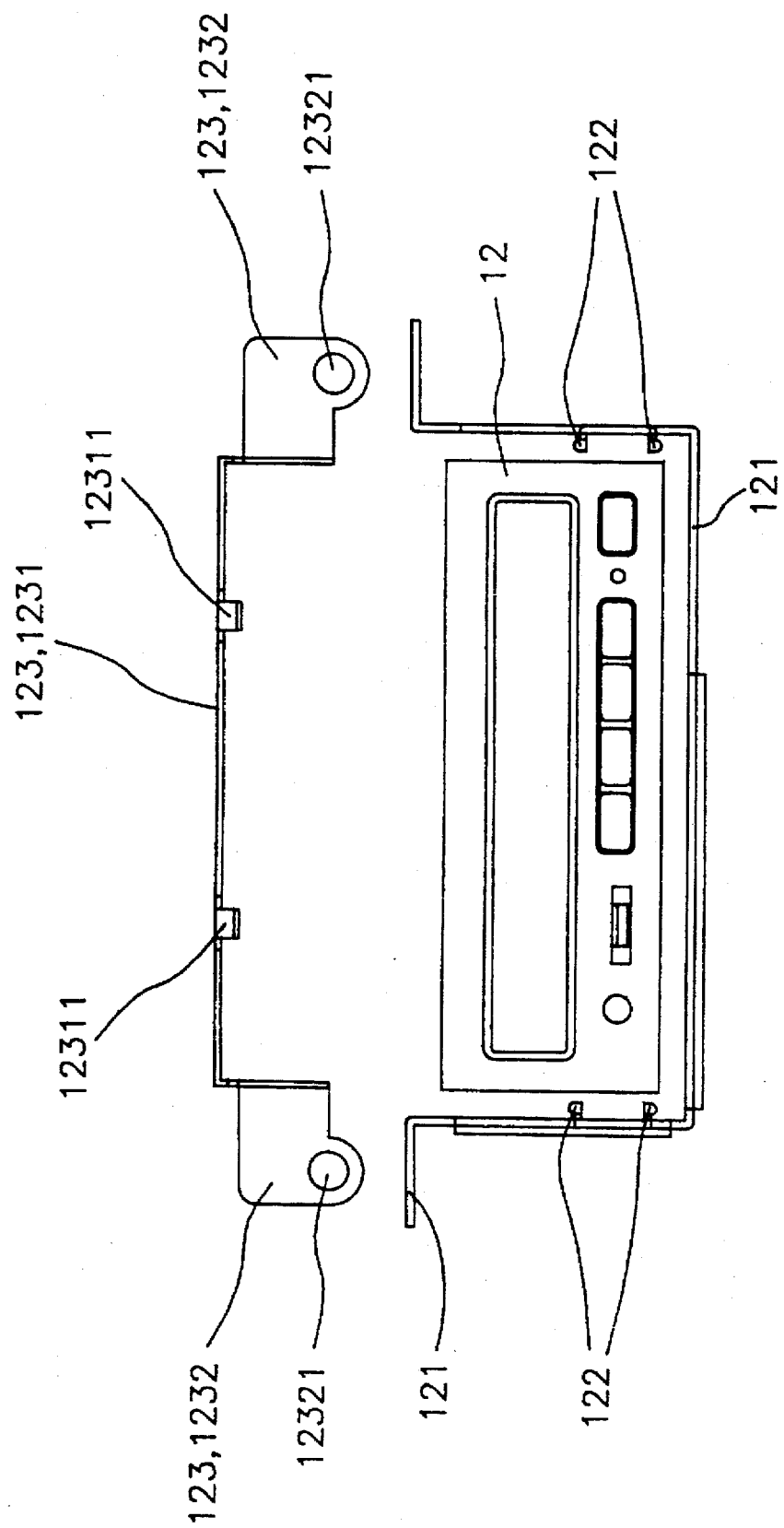
FIG. 1(c) shows still another schematic view of the preferred embodiment according to the present invention.
Figure 1D:
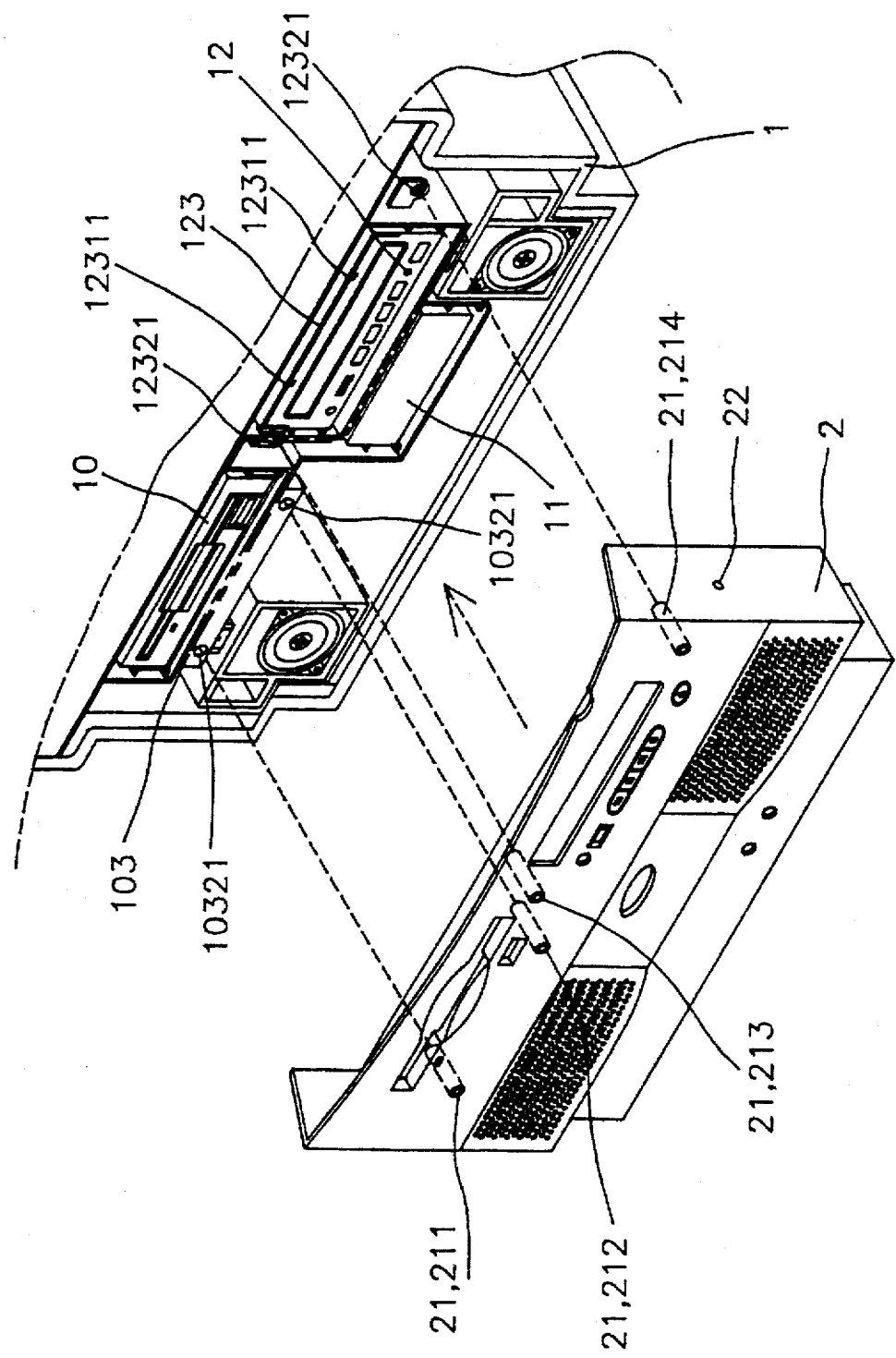
FIG. 1(d) shows still another schematic view of the preferred embodiment according to the present invention.

The front board 2 is provided with the first floating fastening element 21, which is in turn provided with four locating protuberances 211, 212, 213 and 214, as shown in FIG. 1(d). The front board 2 is further provided with a through hole 22.

The second floating fastening elements 103 and 123 are fastened respectively with the floppy disk drive 10 and the CD-ROM drive 12.

As illustrated in FIG. 1(b), the second floating fastening element 103 comprises a locating frame 1031 and a connection plate 1032 which is made integrally with the locating frame 1031 and is provided with a plurality of locating holes 10321 engageably with the locating protuberances 211 and 212, as shown in FIG. 1(d). The locating frame 1031 is of a recessed construction and has a front opening and a rear opening. The connection plate 1032 is located at the front edge of the bottom of the front opening of the locating frame 1031. As shown in FIG. 1(b) and FIG. 1(d), the second floating fastening element 103 is received in the receiving frame 101 such that the second floating fastening 103 is kept apart from the urging element 102 by a small interval. In the meantime, the floppy disk drive 10 is received in the locating frame 1031.

In the event that the locating protuberances 211 and 212 of the front board 2 cannot be caused to engage with the locating holes 10321 of the connection plate 1032, the locating frame 1031 can be pushed by the connection place 1032 to make the floppy disk drive 10 move with the so as to enable the locating holes 10321 to engage the locating protuberances 211 and 212 of the front board 2.

As shown in FIG. 1(c), another second floating fastening element 123 comprises a locating frame 1231 and a connection plate 1232 which is made integrally with the locating frame 1231. The locating frame 1231 has two holding members 12311 for holding the CD-ROM drive 12 which is mounted on the receiving frame 121. The connection plate 1232 has two locating holes 12321 engageable with the locating protuberances 213 and 214 of the first floating fastening element 21 of the front board 2, as shown in FIG. 1(d). The locating frame 1231 is of an inverted U-shaped construction, as shown in FIG. 1(c). Two connection plates 1232 are fastened respectively with two leg portions of the inverted U-shaped frame 1231.

As shown in FIG. 1(c) and FIG. 1(d), the CD-ROM drive 12 is kept apart from an urging member 122 by a small interval. In the event that the locating protuberances 213 and 214 of the front board 2 cannot be caused to engage the locating holes 12321 of the connection plate 1232, the CD-ROM drive 12 can be pushed by the holding members 12311 of the locating frame 1231 to move upward and between the left and the right sides of the small interval located between the CD-ROM drive 12 and the urging member 122. As a result, the locating protuberances 213 and 214 of the front board 2 can be caused to engage with the locating holes 12321 so as to fasten the front board 2 with the frame body 1 of the moniputer housing of the present invention.

Figure 2:
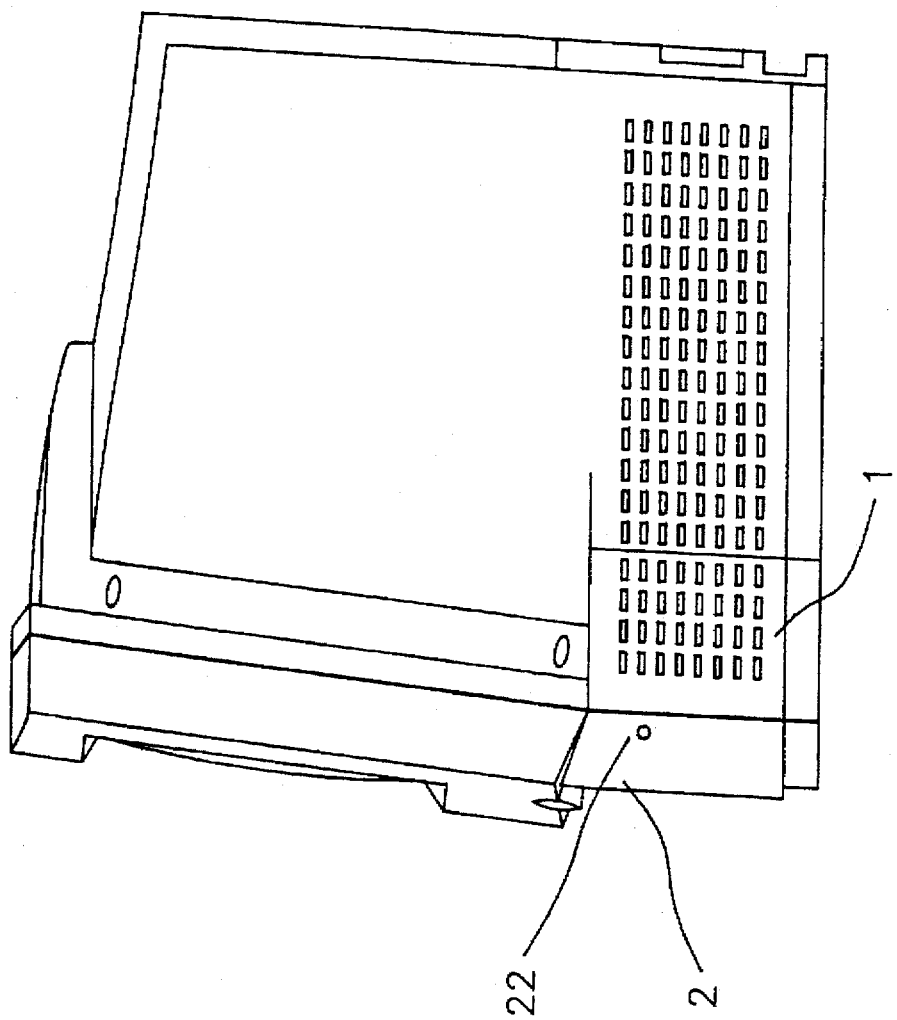
FIG. 2 is a right elevational view showing that the front board is joined with the frame body of the preferred embodiment according to the present invention.

FIG. 2 is a right elevational view showing that the front board 2 is joined with the frame body 1.

Figure 3A:
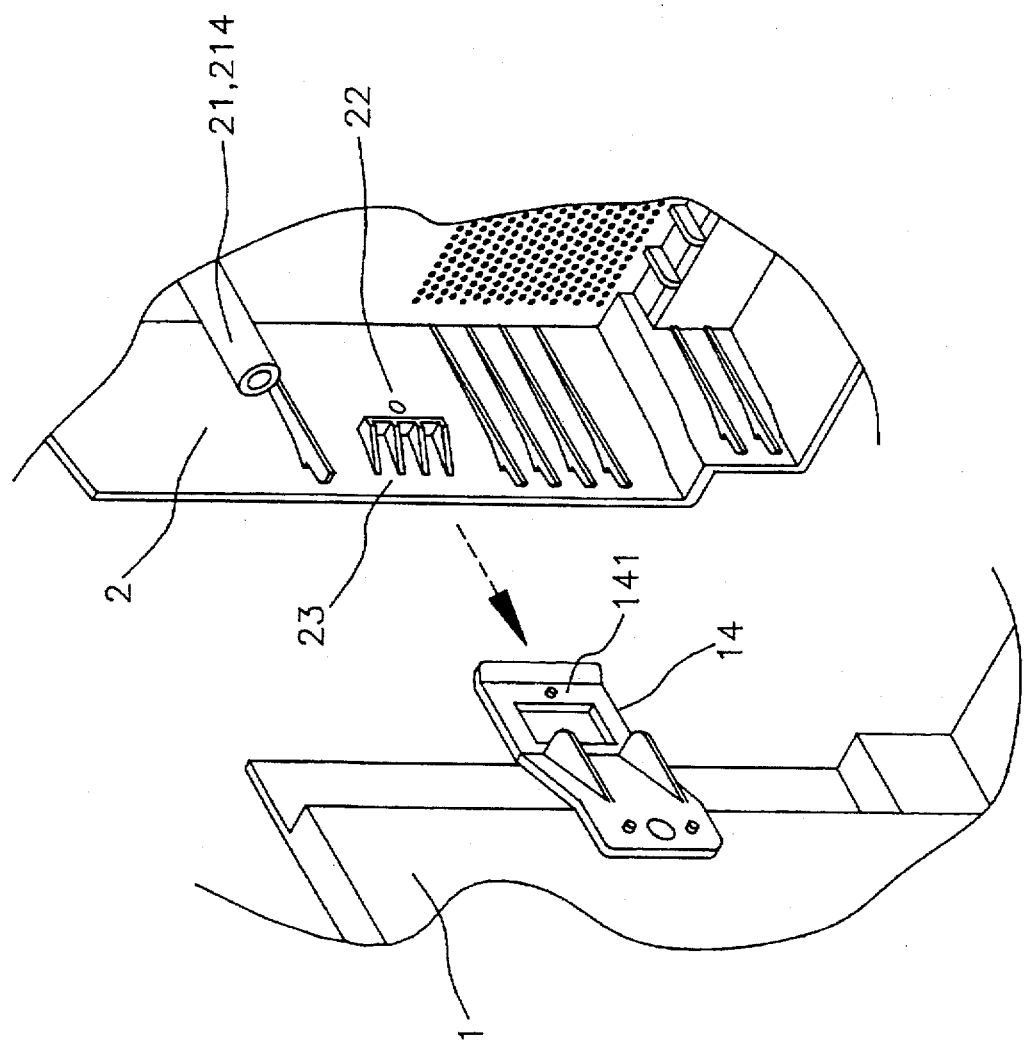
FIG. 3(a) is a schematic view illustrating the process in which the front board is joined with the frame body of the moniputer housing of the preferred embodiment according to the present invention.
Figure 3B:
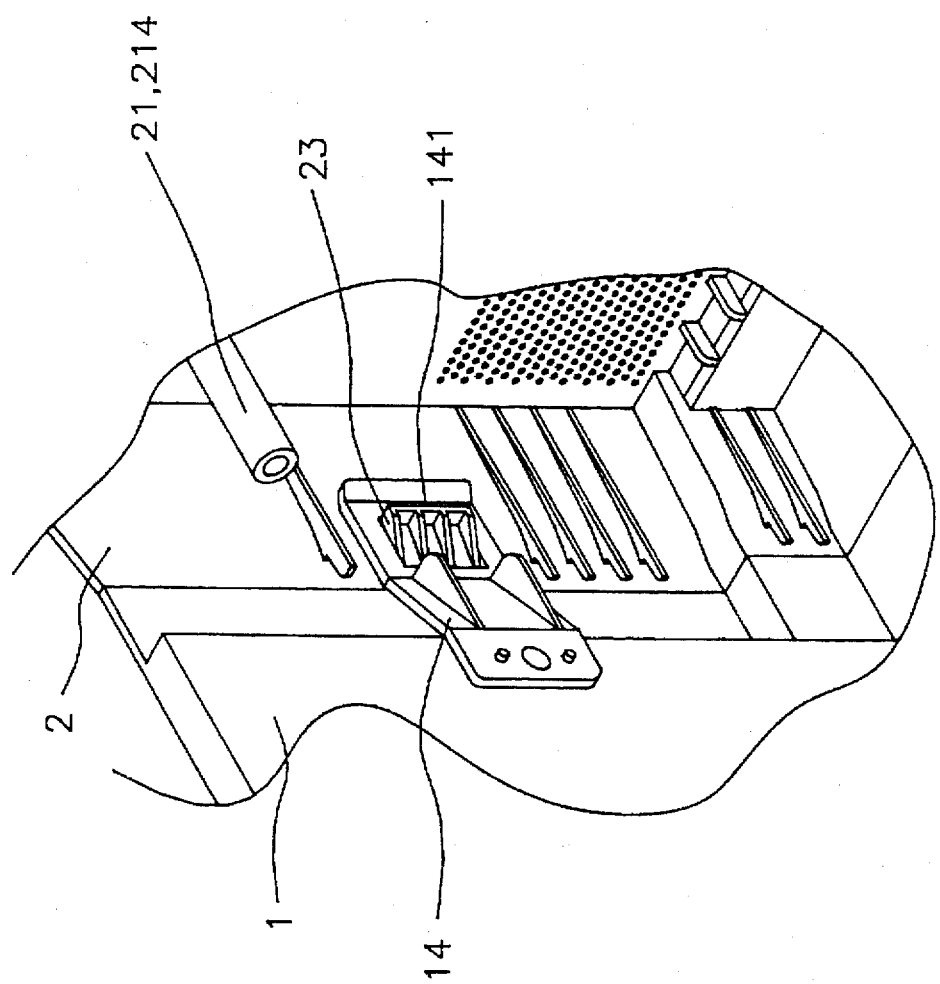
FIG. 3(b) is another schematic view illustrating the process in which the front board is fastened with the frame body of the moniputer housing of the preferred embodiment according to the present invention.

As shown in FIG. 3(a) and FIG. 3(b), the front board 2 is provided with a male retainer 23 while the frame body 1 of the moniputer of the present invention is provided with a female retainer 14 engageable with the male retainer 23 of the front board 2. The male retainer 23 is made integrally with the front board 2. The female retainer 14 is made of a iron or plastic material. The front board 2 is further provided with a through hole 22 large enough to enable a screw driver or a pointed object to be inserted therethrough to urge a top portion 141 of the female retainer 14 so as to bring about the disengagement of the male retainer 23 with the female retainer 14.

The embodiment of the present invention described above is to be regarded in all respects as being merely illustrative and not restrictive. Accordingly, the present invention may be embodied in other specific forms without deviating from the spirit thereof. The present invention is therefore to be limited only by the scopes of the following appended claims.

What is claimed is:

1. A computer housing which comprises:
   a frame body having a receiving frame for holding therewith a data read/write device;
   a front board provided with a first floating fastening element; and
   a second floating fastening element for fastening said data read/write device such that said second floating fastening element can be moved to engage with said first floating fastening element of said front board so as to enable said front board to be fastened securely with said frame body, wherein
   said second floating fastening element comprises a locating frame and a connection plate having a locating hole for engaging with said first floating fastening element.

2. The computer housing as defined in claim 1 wherein said front board is detachably fastened with said frame body.

3. The computer housing as defined in claim 2 wherein said front board is provided with a plurality of retaining members, and wherein said frame body is provided with a plurality of retaining members engageable with said retaining members of said front board.

4. The computer housing as defined in claim 3 wherein said front board is provided with a through hole which is corresponding in location to said retaining members of said frame body and is dimensioned to allow a hand tool or a pointed object to go therethrough to urge said retaining members of said frame body so as to cause said front board to disengage from said frame body.

5. The computer housing as defined in claim 1 wherein said first floating fastening element comprises at least one locating protuberance.

6. The computer housing as defined in claim 5 wherein said connection plate can be moved to enable said locating hole of said connection plate to engage with one of said locating protuberances of said first floating fastening element.

7. The computer housing as defined in claim 5 wherein said locating frame is of an inverted U-shaped construction and is provided with a holding member for retaining said data read/write device mounted on said receiving frame of said frame body, and wherein said connection plate is movably fastened with one of two leg portions of said locating frame having said inverted U-shaped construction.

8. The computer housing as defined in claim 7 wherein said connection plate can be moved to enable said locating hole of said connection plate to engage with one of said locating protuberances of said first floating fastening element.

9. The computer housing as defined in claim 1 wherein said locating frame and said connection plate are made integrally.

10. The computer housing as defined in claim 1 wherein said locating frame is of a recessed construction for holding said data read/write device, and wherein said connection plate is located at a front edge of a bottom of an opening of said locating frame.

11. The computer housing as defined in claim 1 wherein said receiving frame of said frame body is provided with an urging member for limiting the motion of said data read/write device in said receiving frame.

12. The computer housing as defined in claim 1 wherein said computer housing is a moniputer housing.

* * * * *